United States Patent Office 3,000,921
Patented Sept. 19, 1961

3,000,921
NITRO ISOCYANATES
Marvin H. Gold, Pasadena, Calif., assignor to Aerojet-General Corporation, Azusa, Calif., a corporation of Ohio
No Drawing. Filed June 5, 1957, Ser. No. 664,885
10 Claims. (Cl. 260—453)

This invention relates to new compounds and a method for their preparation. In particular it relates to nitro substituted isocyanates having the general formula:

$$NO_2-\underset{\underset{NO_2}{|}}{\overset{\overset{NO_2}{|}}{C}}-A-NCO$$

wherein A is a lower alkylene radical.

This application is continuation in part of my copending United States patent application Serial Number 416,386 filed March 15, 1954, now abandoned.

Isocyanates of my invention are prepared by reacting a polynitro acid halide with the azide of an alkali or alkaline earth metal and subsequently heating under anhydrous conditions to effect rearrangement, as illustrated by the general reaction scheme set forth below:

$$NO_2-\underset{\underset{NO_2}{|}}{\overset{\overset{NO_2}{|}}{C}}-A-\overset{O}{\overset{\|}{C}}-X \xrightarrow{(N_3)^-}$$

$$NO_2-\underset{\underset{NO_2}{|}}{\overset{\overset{NO_2}{|}}{C}}-A-\overset{O}{\overset{\|}{C}}-N_3 \xrightarrow{\Delta} NO_2-\underset{\underset{NO_2}{|}}{\overset{\overset{NO_2}{|}}{C}}-A-NCO$$

wherein A is a lower alkylene radical and X is a halogen radical.

The acid halides employed as starting materials in the above reaction are prepared by reacting the corresponding acids with a thionyl halide. The acids are obtained by condensing acrylic acid esters with nitroform to yield 4,4,4-trinitrobutyric acid. The length of the carbon chain of this acid may be varied as desired by conventional methods, as for example, by reducing the acid halide to the alcohol with sodium borohydride, as disclosed in assignee's copending application No. 392,471, filed November 16, 1953, now abandoned converting the alcohol to the halide, subsequently to the Grignard reagent and condensing with carbon dioxide or ethylene oxide. The carbon chain of the acid may be shortened by forming the isocyanate, converting it to the amine with a strong mineral acid, forming the alcohol with nitrous acid and finally oxidizing it to the acid.

To more clearly illustrate my invention, the following example is presented. It is to be understood, however, that this example is presented merely as a means of illustration and is not intended to limit the scope of the invention in any way.

EXAMPLE

*Preparation of 3,3,3-trinitropropyl isocyanate*

A solution of 2.69 gm. (0.0414 mole) of sodium azide in 15 ml. of water was placed in a 125 ml., three necked flask, fitted with a mechanical stirrer and thermometer. The solution was cooled in an ice bath and 5.0 gm. (0.0207 mole) of 4,4,4-trinitrobutyryl chloride in 15 ml. of acetone was added. The resulting solution, which turned yellow, was stirred at room temperature for two hours. The mixture was then extracted with 75 ml. of chloroform and the extract was washed in order with three 25 ml. portions of water, one 25 ml. portion of 5% sodium bisulfite, two 25 ml. portions of water, and one 25 ml. portion of a saturated solution of sodium chloride. It was then dried over 10 gm. of anhydrous magnesium sulfate for 1.5 hours and the dried solution was heated in a water bath to 55° C. The azide began to decompose at about 35° C. About 550 ml. of nitrogen was collected (calculated: 464 ml.) and the solution was refluxed for an additional 1.5 hours. The excess chloroform was removed under reduced pressure and the remaining residue was distilled; B.P. 73–75° C. (1μ), $n_D^{25}$=1.4805, $d^{25}$=1.5266. The colorless oil obtained amounted to 3 gm., 65% of theoretical. The elemental analysis of the product is as follows:

Calculated for $C_4H_4N_4O_7$: percent C, 21.83; percent H, 1.83; percent N, 25.41. Found: percent C, 21.94; percent H, 1.76; percent N, 25.52.

When the isocyanate was allowed to react with ethyl alcohol, the corresponding urethane was obtained; M.P. 65.6–66° C.

For reasons of convenience and cost, although any of the acid halides may be employed, it is preferred to employ the acid chlorides as starting materials for the preparation of the monoisocyanates of this invention.

It will be appreciated by those skilled in the art that reaction temperatures are not critical in the practice of my invention and that while the temperatures employed in the above example are preferred ordinarily, they can be varied over a wide range without affecting the course of the reaction.

My invention provides an entirely new series of nitro containing monoisocyanates as well as a convenient method for their preparation. Any of the nitro containing acid halides disclosed will undergo this reaction to form the valuable intermediates of this invention. Thus it is apparent that a wide variety of nitro containing monoisocyanates such as 5,5,5-trinitropentyl isocyanate, 4,4,4-trinitrobutyl isocyanate and 6,6,6-trinitrohexyl isocyanate can be prepared by merely reacting an appropriate acid halide with an azide salt and heating under anhydrous conditions to effect the desired rearrangement, in accordance with the teachings of this invention.

The nitro substituted isocyanates of my invention readily react with nitroalcohols such as 2,2-dinitropropanol to yield polynitro-carbonates as disclosed in assignees copending United States Patent Application Serial Number 482,409, now United States Patent No. 2,978,491. The polynitrocarbonates thus prepared are useful as high explosives and can be used in any conventional explosive missile, projectile, rocket, or the like, as the main explosive charge. An example of such a missile is disclosed in United States Patent Number 2,470,162, issued May 17, 1949. One way of using the high explosives in a device such as that disclosed in United States Patent Number 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time-fuse mechanism firing a detonating explosive such as lead azide or mercury fulminate.

I claim:

1. As compositions of matter, the nitro containing monoisocyanates having the formula:

$$NO_2-\underset{\underset{NO_2}{|}}{\overset{\overset{NO_2}{|}}{C}}-A-NCO$$

wherein A is a lower alkylene radical.

2. As a composition of matter, 3,3,3-trinitropropyl isocyanate having the structural formula:

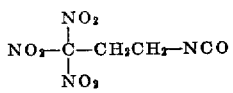

3. As a composition of matter, 4,4,4-trinitrobutyl isocyanate having the structural formula:

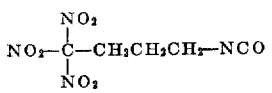

4. As a composition of matter, 5,5,5-trinitropentyl isocyanate having the structural formula:

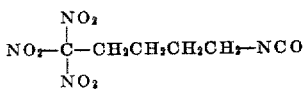

5. As a composition of matter, 6,6,6-trinitrohexyl isocyanate having the structural formula:

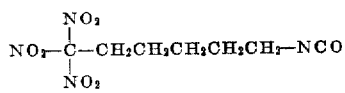

6. The method of preparing nitro containing mono-isocyanates having the formula:

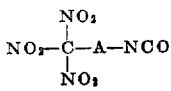

which comprises reacting a nitro acid halide having the formula:

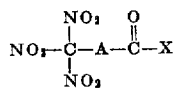

wherein A is a lower alkylene radical and X is a halogen radical; with an azide of an element selected from the group consisting of alkali and alkaline earth meals, and subsequently heating under anhydrous conditions to effect rearrangement.

7. The method of preparing 3,3,3-trinitropropyl isocyanate which comprises reacting 4,4,4-trinitrobutyryl chloride with sodium azide in aqueous solution and subsequently heating under anhydrous conditions.

8. The method of preparing 4,4,4-trinitrobutyl isocyanate which comprises reacting 5,5,5-trinitropentanoyl chloride with sodium azide in aqueous solution and subsequently heating under anhydrous conditions.

9. The method of preparing 5,5,5-trinitropentyl isocyanate which comprises reacting 6,6,6-trinitrohexanoyl chloride with sodium azide in aqueous solution and subsequently heating under anhydrous conditions.

10. The method of preparing 6,6,6-trinitrohexyl isocyanate which comprises reacting 7,7,7-trinitroheptanoyl chloride with sodium azide in aqueous solution and subsequently heating under anhydrous conditions.

No references cited.